Jan. 10, 1956    H. J. STEGEMAN    2,730,084
AIR INTAKE STACK FOR GASOLINE MOTORS
Filed Sept. 15, 1953
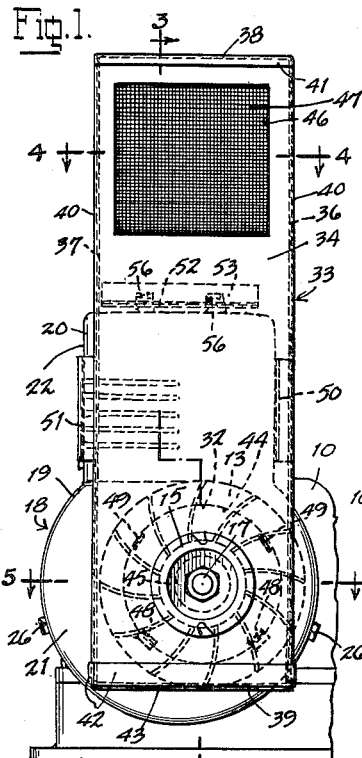
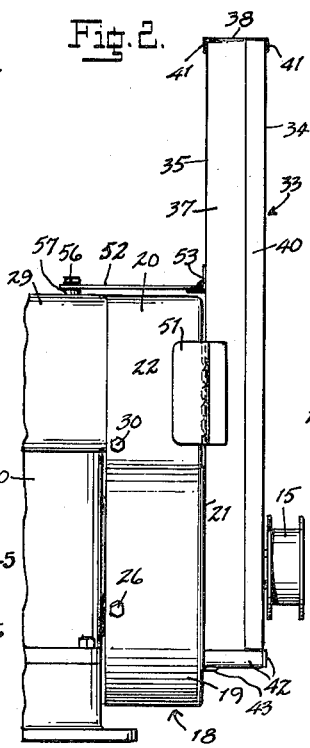
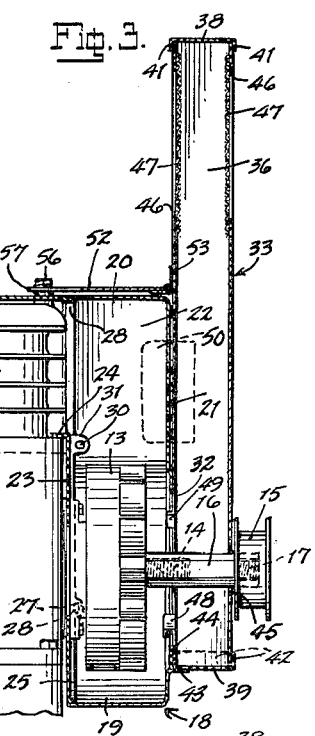
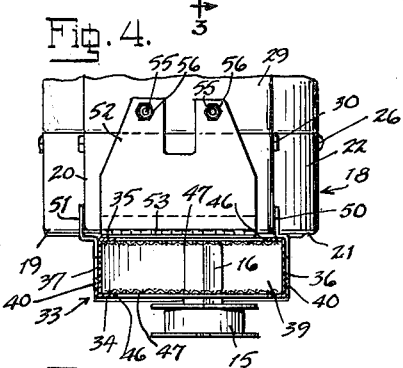
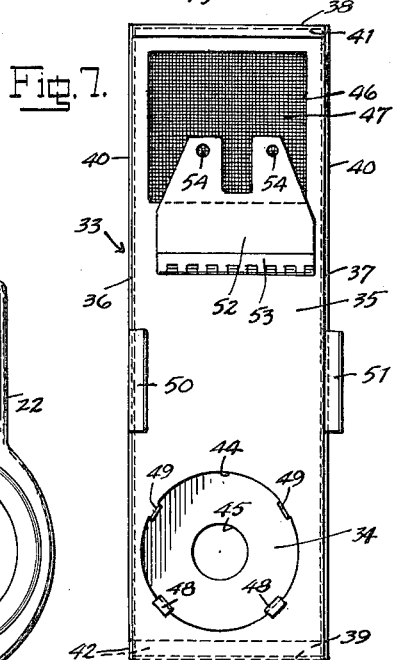
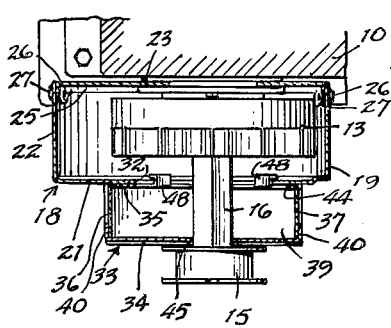
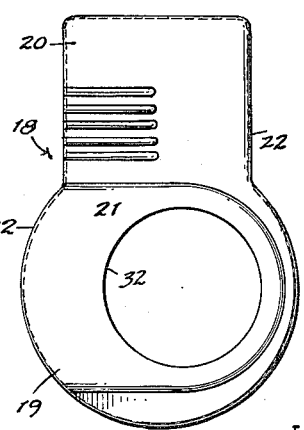
INVENTOR
HENRY J. STEGEMAN
BY
ATTORNEY United States Patent Office 2,730,084
Patented Jan. 10, 1956

2,730,084

AIR INTAKE STACK FOR GASOLINE MOTORS

Henry J. Stegeman, Fairfield, Conn., assignor to The Locke Steel Chain Company, Bridgeport, Conn., a corporation of Connecticut Application September 15, 1953, Serial No. 380,175

6 Claims. (Cl. 123—41.65)

The present invention relates to an air intake stack for air cooling of gasoline motors, and particularly such stack for excluding dust, grass clippings, etc. from the air intake of the motor of power driven lawn mowers and the like, being an improvement over the structures disclosed in my Patent 2,172,992, dated September 12, 1939, and in my Patent 2,620,782, dated December 9, 1952.

In this type of structure the fan intake for the air cooled motor in a lawn mower or similar machine is positioned relatively close to the ground and near the cutting reels of the lawn mower, so that the dust stirred up by the mower and the flying grass clippings from the reels of the mower are drawn towards such intake and either enter the same and clog up the cooling vanes of the motor, or where such entrance is covered by a screen the grass clippings tend to clog the screen. The result in either case is overheating and damage to the motor.

According to the present invention the stack is attached to a blower fan enclosing casing provided upon the motor, this casing having an air intake opening to the fan through which extends the shaft of a starting pulley for the motor. It is an object of the invention to provide such opening in the casing of relatively large size and to provide in the stack an opening of substantially equal large size registering therewith, so that the stack in no way encloses or diminishes the size of the opening. The stack provides an enclosed air shaft from the opening in the casing to screened intake openings provided in the stack at a relatively high level whereby grass clippings and the like cannot be drawn into the blower casing.

Another object of the invention is to provide an improved means for readily attaching the stack to the blower casing which means will serve to prevent relative displacement of the stack relative to the casing. In particular, it is proposed to provide lugs for interlocking engagement with the periphery of the opening in the casing to lock the stack against outward movement, and additional lugs engageable within the periphery of the opening to prevent relative vertical movement of the stack. These lugs are adapted to permit the attachment or detachment of the stack by positioning the stack in a slightly tilted position and to retain the stack against relative movement when placed in a vertical position.

A further object is to provide guide means upon the stack for positioning it in relation to the casing so as to align it vertically therewith while permitting the stack to be tilted for the purpose of attaching or detaching it.

Another object is to provide improved securing means adapted to be secured to the upper side of the motor casing to prevent relative movement of the stack, such securing means being in the form of a hinged flap which may be folded flat against the stack for compactness in storage or shipping, and which may be swung into a projected operative position for attachment to the motor.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 1 is a front elevation showing the assembly of the air intake stack upon the blower casing of the motor;

Fig. 2 is a side elevation, looking from the left in Fig. 1, and showing a portion of the motor upon which the blower casing is mounted;

Fig. 3 is a vertical sectional view taken along the line 3—3 of Fig. 1;

Fig. 4 is a horizontal sectional view taken along the line 4—4 of Fig. 1;

Fig. 5 is a horizontal sectional view taken along the line 5—5 of Fig. 1;

Fig. 6 is a front elevation of the motor casing detached from the motor; and

Fig. 7 is a rear elevation of the air intake stack detached from the casing.

Referring to the drawings the gasoline motor 10 is provided at its upper portion with a head 11 and cooling fins 12, and upon its lower block portion is provided at one side with a blower fan 13 carried upon the motor shaft, the threaded projecting end 14 of which carries a starting pulley 15, this pulley being outwardly spaced from the fan by a relatively long hub 16, preferably of hexagonal shape, screwed upon the threaded end 14 of the motor shaft and having at its outer end a threaded stud 17 upon which the starting pulley is screwed. The long hub 16 is provided to dispose the starting pulley outwardly of the air intake stack of the invention, as will presently more fully appear. In the usual type of engine, not provided with an air intake stack, this pulley is located outside of the blower casing but relatively closer to the blower fan.

Enclosing the blower 13 is a sheet metal blower casing 18 which includes a lower circular portion 19 and an upper rectangular portion 20, and comprises a front wall 21 and continuous top, side and bottom walls 22. The rear side of the lower circular portion is fully closed by a plate 23 secured between the side of the engine block and the blower fan, its upper end being provided with a flange 24 engaged over the upper side of the engine block below the fins 12 of the motor head, this plate also having a circumferential edge flange 25 which fits into the circular portion 19 of the casing where it is secured by screws 26 engaged in projecting lug portions 27 of the flange. The upper rectangular portion 20 of the casing fits in telescopic relation with a flange 28 of a motor head casing 29 engaged over the motor head 11, the blower casing 18 being secured to the motor head casing 29 by screws 30 engaged in projecting lug portions 31 of the flange 28. The front wall 20 of the blower casing is provided in its lower circular portion with a relatively large circular intake opening 32, the hub 16 extending centrally through this opening.

The air intake stack, generally indicated as 33, comprises a generally rectangular structure including front and rear walls 34 and 35, side walls 36 and 37, a top wall 38 and a bottom wall 39, the structure thus being in the nature of an elongated rectangular box in which all of the walls are permanently and rigidly connected together and which, for this purpose, may be of any suitable construction adapted to the production of such a structure from sheet metal.

In the disclosed embodiment the front wall is provided with side flanges 40 secured by spot welding to the side walls 36 and 37, which latter are integrally connected by bends with the rear wall 35. The top wall which is integrally connected by bends with the side walls 36 and 37 has downwardly bent flanges 41 secured by spot welding to the front and rear walls, and the bottom wall has front and side flanges 42 secured by spot welding to the front wall 34 and side walls 36 and 37, the rear wall 34 being provided at its lower end with a forwardly bent flange 43 secured by spot welding to the under side of the bottom wall.

Near the lower end of the rear wall 35 there is provided a relatively large circular opening 44 which corresponds in diameter to the circular opening 32 of the blower casing 18, and in the front wall 34 in coaxial relation with the opening 44 there is provided a relatively small circular hole 45 adapted to receive the hub 16 of the starter pulley 15, as will presently more fully appear. Near the upper end of the stack there is provided in each front and rear wall a large rectangular air intake opening 46 covered by a metal screen 47 which is disposed at the inner side of the wall and is secured outwardly of the edges of the opening by spot welding.

A pair of hook-shaped lugs 48 is provided at the lower side of the opening 44, being equally spaced from the vertical center line of the opening, and in substantially vertically opposed relation thereto a pair of straight lugs 49 is provided at the upper side of the opening 44. These lugs are formed by leaving integral extensions of the metal of the rear wall projecting within the opening and bending outwardly from the opening. The spacing of the hook portion of the lugs 48 from the rearward surface of the rear wall 35 is such as to permit these lugs to be hooked into engaged relation with the periphery of the opening 32 of the blower casing with the stack in a slightly outwardly tilted position, the projection of the lugs 49 being such as to clear the outer surface of the blower casing when the lugs 48 are engaged into the opening 32 with the stack tilted.

When the lugs 48 are engaged within the opening the stack is moved downwardly to hook the lugs over the periphery of the opening 32, at the same time bringing the straight lugs 49 downwardly to the point where they slip into the upper portion of the opening 32 as the stack is tilted into vertical position, as shown in Fig. 3. In this position the lugs 49 prevent vertical displacement of the stack as long as the stack remains vertical, but if it is tilted outwardly the stack may be disengaged by a slight lifting movement to free the hooked lugs 48 from the opening 32, the lugs 49 being at the same time disengaged from the opening so that they will not oppose upward disengaging movement.

Upon the side walls 36 and 37 of the stack there are respectively secured guide fins 50 and 51 which are adapted to fit closely against the side walls 22 of the upper rectangular portion 20 of the blower casing. Inasmuch as the stack is not centralized with respect to the blower casing, the fins are of offset angle formation, the fin 50 being inwardly offset and the fin 51 outwardly offset, so that they are engaged in parallel relation with the side walls of the portion 27. These fins hold the stack in vertical alignment with the blower casing but permit it to be tilted for the purpose of engaging or disengaging the lugs 48 and 49 in the opening 44.

Provided upon the rear wall 35 of the stack at a point adjacent the upper side of the blower casing 18 in the assembled relation as shown in Figs. 2 and 3, is a hinged fastening flap 52, secured by spot welding to one flap of a hinged unit 53, the other flap of the hinged unit being secured by spot welding to the rear wall 35. Bolt receiving holes 54 are provided in the outer end of the flap and in the projected position as shown in Figs. 2 and 3 these holes are engaged by threaded studs 55 secured upon the engine head and projected upwardly through the motor head casing 29, fastening nuts 56 being screwed upon the studs. Spacing washers 57 are provided between the under side of the flap and the motor head casing 29. The flap secures the stack against relative outward and vertical movement and in order to remove the stack it is only necessary to remove the nuts 56 and swing the flap upwardly from the studs 55, whereupon the stack may be tilted outwardly from its vertical position to enable it to be detached by disengaging the lugs 48 and 49 from the opening 44. As shown in Fig. 7 the flap may be folded in flat relation against the rear wall of the stack for compactness in storage or shipping. In order to attach or detach the stack the starting pulley 15 is first disengaged from the hub 16 which allows the end of the hub to be freely inserted in or removed from the hole 45. When the stack is secured in place the pulley may be screwed upon the threaded end of the hub.

What is claimed is:

1. The combination with a gasoline motor provided with a blower fan and a blower fan casing enclosing said blower fan and having a vertical wall provided with an air intake opening of an elongated air intake stack having a screened air entrance toward its upper end and including a vertical rear wall, said rear wall being engageable with said vertical wall of said casing in substantially parallel relation and having an opening toward its lower end in substantial register with said casing opening, interlocking means projecting outwardly from the peripheral edge of one of said openings engageable within the other of said openings, and fastener means connected between said stack and said motor to secure said stack in vertical position.

2. The combination with a gasoline motor provided with a blower fan and a blower fan casing enclosing said blower fan and having a vertical wall provided with an air intake opening of an elongated air intake stack having a screened air entrance toward its upper end and including a vertical rear wall, said rear wall being engageable with said vertical wall of said casing in substantially parallel relation and having an opening toward its lower end in substantial register with said casing opening, interlocking means projecting outwardly from the peripheral edge of one of said openings engageable within the other of said openings, and a flap member hinged to the rear wall of said stack and connectable to said motor to secure said stack in vertical position.

3. The combination with a gasoline motor provided with a blower fan and a blower fan casing enclosing said blower fan and having a vertical wall provided with an air intake opening and vertical side walls of an elongated air intake stack having a screened air entrance toward its upper end and including a vertical rear wall and vertical side walls, said rear wall being engageable with said vertical wall of said casing in substantially parallel relation and having an opening toward its lower end in substantial register with said casing opening, interlocking means projecting outwardly from the peripheral edge of one of said openings engageable within the other of said openings, a pair of rearwardly projecting guide fins respectively secured to said side walls of said stack and engageable with said side walls of said casing, and fastener means connected between said stack and said motor to secure said stack in vertical position.

4. The combination with a gasoline motor provided with a blower fan and a blower fan casing enclosing said blower fan and having a vertical wall provided with an air intake opening of an elongated air intake stack having a screened air entrance toward its upper end and including a vertical rear wall, said rear wall being engageable with said vertical wall of said casing in substantially parallel relation and having an opening toward its lower end in substantial register with said casing opening, hook means projecting outwardly from the lower portion of the peripheral edge of said stack opening adapted through insertion in said casing opening and relative downward movement to be engaged in hooked relation with the lower portion of the peripheral edge of said casing opening, said hook means permitting relative swinging of said stack between an outer tilted position and an inner vertical position, lug means projecting outwardly from the upper portion of the peripheral edge of said stack opening engageable within said casing opening through the downward movement and inward swinging of said stack into vertical position and adapted when engaged within said casing opening to restrain upward movement of said stack to thereby retain said hook means in engaged relation with said lower peripheral edge portion of said casing opening, and fastener means connected between said stack and said motor to secure said stack in vertical position.

5. The combination with a gasoline motor provided with a blower fan and a blower fan casing enclosing said blower fan and having a vertical wall provided with an air intake opening of an elongated air intake stack having a screened air entrance toward its upper end and including a vertical rear wall, said rear wall being engageable with said vertical wall of said casing in substantially parallel relation and having an opening toward its lower end in substantial register with said casing opening, a pair of hook means projecting outwardly from the lower portion of the peripheral edge of said stack opening in equally spaced relation at each side of the vertical center line of said stack opening adapted through insertion in said casing opening and relative downward movement to be engaged in hooked relation with the lower portion of the peripheral edge of said casing opening, said hook means permitting relative swinging of said stack between an outer tilted position and an inner vertical position, a pair of lug means projecting outwardly from the upper portion of the peripheral edge of said stack opening in equally spaced relation at each side of the vertical center line of said stack opening engageable within said casing opening through the downward movement and inward swinging of said stack into vertical position and adapted when engaged within said casing opening to restrain upward movement of said stack to thereby retain said hook means in engaged relation with said lower peripheral edge portion of said casing opening, and fastener means connected between said stack and said motor to secure said stack in vertical position.

6. The combination with a gasoline motor provided with a blower fan and a blower fan casing enclosing said blower fan and having a vertical wall provided with an air intake opening and vertical side walls of an elongated air intake stack having a screened air entrance toward its upper end and including a vertical rear wall and vertical side walls, said rear wall being engageable with said vertical wall of said casing in substantially parallel relation and having an opening toward its lower end in substantial register with said casing opening, hook means projecting outwardly from the lower portion of the peripheral edge of said stack opening adapted through insertion in said casing opening and relative downward movement to be engaged in hooked relation with the lower portion of the peripheral edge of said casing opening, said hook means permitting relative swinging of said stack between an outer tilted position and an inner vertical position, lug means projecting outwardly from the upper portion of the peripheral edge of said stack opening engageable within said casing opening through the downward movement and inward swinging of said stack into vertical position and adapted when engaged within said casing opening to restrain upward movement of said stack to thereby retain said hook means in engaged relation with said lower peripheral edge portion of said casing opening, a pair of rearwardly projecting guide fins respectively secured to said side walls of said stack and engageable with said side walls of said casing, and fastener means connected between said stack and said motor to secure said stack in vertical position.

References Cited in the file of this patent

UNITED STATES PATENTS

| | | |
|---|---|---|
| 2,172,992 | Stegeman | Sept. 12, 1939 |
| 2,620,782 | Stegeman | Dec. 9, 1952 |